(12) United States Patent
Lochte

(10) Patent No.: US 12,630,137 B2
(45) Date of Patent: May 19, 2026

(54) METHOD AND DEVICE FOR OPERATING A HYDRAULIC BRAKING SYSTEM, BRAKING SYSTEM AND VEHICLE

(71) Applicant: Robert Bosch GmbH, Stuttgart (DE)

(72) Inventor: Guido Lochte, Erlenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 898 days.

(21) Appl. No.: 17/603,089

(22) PCT Filed: Apr. 22, 2020

(86) PCT No.: PCT/EP2020/061128
§ 371 (c)(1),
(2) Date: Oct. 12, 2021

(87) PCT Pub. No.: WO2020/249290
PCT Pub. Date: Dec. 17, 2020

(65) Prior Publication Data
US 2022/0176932 A1 Jun. 9, 2022

(30) Foreign Application Priority Data

Jun. 8, 2019 (DE) ..................... 10 2019 208 404.4

(51) Int. Cl.
*B60T 8/40* (2006.01)
*B60T 7/04* (2006.01)
(Continued)

(52) U.S. Cl.
CPC ............ *B60T 13/745* (2013.01); *B60T 7/042* (2013.01); *B60T 17/02* (2013.01); *B60T 2270/402* (2013.01); *B60T 2270/82* (2013.01)

(58) Field of Classification Search
CPC ...... B60T 13/745; B60T 7/042; B60T 8/4081; B60T 17/02; B60T 2270/402; B60T 2270/82
See application file for complete search history.

(56) References Cited

U.S. PATENT DOCUMENTS

| | | | | |
|---|---|---|---|---|
| 7,988,241 B2 * | 8/2011 | Ishii | ...................... | B60T 13/746 |
| | | | | 303/122.08 |
| 8,231,181 B2 * | 7/2012 | Hatano | ................. | B60T 13/745 |
| | | | | 303/114.1 |

(Continued)

FOREIGN PATENT DOCUMENTS

| | | |
|---|---|---|
| CN | 102481915 A | 5/2012 |
| CN | 103097214 A | 5/2013 |

(Continued)

OTHER PUBLICATIONS

International Search Report for PCT/EP2020/061128, Issued Jul. 3, 2020.

*Primary Examiner* — Thomas W Irvin
(74) *Attorney, Agent, or Firm* — NORTON ROSE FULBRIGHT US LLP

(57) ABSTRACT

A method for operating a hydraulic braking system including a main brake cylinder and at least one brake circuit, which includes at least one hydraulically actuatable wheel brake, an activatable pressure generating unit configured to generate a hydraulic pressure in the brake circuit when a pressure demand occurs, and an activatable auxiliary pressure generating unit configured to alternatively generate the hydraulic pressure in the brake circuit, the auxiliary pressure generating unit being activated upon recognition of a malfunction in the pressure generating unit to generate the hydraulic pressure. The auxiliary pressure generating unit is assigned an activatable control valve in order to interrupt or establish a connection to the main brake cylinder. The (Continued)

braking system is monitored for the occurrence of a brake demand, and that upon detection of a brake demand, the control valve is activated to interrupt the connection to the main brake cylinder.

8 Claims, 2 Drawing Sheets

(51) Int. Cl.
    *B60T 13/74*         (2006.01)
    *B60T 17/02*         (2006.01)

(56) References Cited

U.S. PATENT DOCUMENTS

| | | | | |
|---|---|---|---|---|
| 8,333,442 B2 * | 12/2012 | Hatano | ................ | B60T 8/4081 |
| | | | | 303/114.1 |
| 9,776,607 B2 * | 10/2017 | Brenn | .................... | B60T 8/321 |
| 10,730,501 B2 * | 8/2020 | Ganzel | ................. | B60T 13/166 |
| 11,014,545 B2 * | 5/2021 | Plewnia | ................ | B60T 8/4081 |
| 11,691,606 B2 * | 7/2023 | Plewnia | ................ | B60T 13/148 |
| | | | | 303/2 |
| 11,807,201 B2 * | 11/2023 | Plewnia | .................. | B60T 7/042 |
| 2007/0278855 A1 * | 12/2007 | Hatano | ................ | B60T 8/4081 |
| | | | | 303/116.1 |
| 2014/0028084 A1 * | 1/2014 | Biller | .................... | B60T 13/686 |
| | | | | 303/9.62 |
| 2016/0214582 A1 * | 7/2016 | Brenn | ..................... | B60T 7/042 |
| 2019/0092303 A1 * | 3/2019 | Kato | ..................... | B60T 8/4081 |
| 2020/0070797 A1 * | 3/2020 | Plewnia | ................ | B60T 15/041 |
| 2020/0139949 A1 * | 5/2020 | Dolmaya | ............. | B60T 8/4081 |
| 2020/0207320 A1 * | 7/2020 | Plewnia | ................ | B60T 13/745 |
| 2020/0207321 A1 * | 7/2020 | Plewnia | ................ | B60T 13/148 |

FOREIGN PATENT DOCUMENTS

| | | | |
|---|---|---|---|
| CN | 107735294 A | 2/2018 |
| DE | 10304144 A1 | 8/2004 |
| DE | 102013226401 A1 | 6/2015 |
| DE | 102014211661 A1 | 12/2015 |
| JP | 2017007524 A | 1/2017 |

* cited by examiner

METHOD AND DEVICE FOR OPERATING A HYDRAULIC BRAKING SYSTEM, BRAKING SYSTEM AND VEHICLE

The present invention relates to a method for operating a hydraulic braking system for a vehicle, in particular, a motor vehicle, the braking system including a main brake cylinder actuatable by a driver and at least one brake circuit connected to the main brake cylinder, which includes at least one hydraulically actuatable wheel brake, at least one activatable inlet valve being connected upstream from the wheel brake for adjusting a braking force of the wheel brake, and including a pressure generating unit, which is designed to generate a hydraulic pressure in the at least one brake circuit, also independently of an actuation of the main brake cylinder, when a brake demand occurs, and including an auxiliary pressure generating unit, which is designed to alternatively generate the hydraulic pressure in the at least one brake circuit, the pressure generating unit being monitored for malfunctions and upon recognition of a malfunction, the auxiliary pressure generating unit being activated, and the pressure generating unit being assigned a first control valve in order to establish or to interrupt a connection to the auxiliary pressure generating unit and the auxiliary pressure generating unit being assigned a second activatable control valve in order to interrupt or to establish a connection to the main brake cylinder.

The present invention further relates to a device for operating the above-described braking system and to a correspondingly designed braking system including such a device. The present invention also relates to a vehicle, in particular, to a motor vehicle, which includes such a braking system.

BACKGROUND INFORMATION

Methods, devices and braking systems of the type mentioned above are available in the related art. With the increasing electrification of motor vehicles and the increasing degree of autonomous driving functions, braking systems also continue to be developed, which are able to carry out a braking process independently of a brake pedal actuation. In conventional hydraulic braking systems, the driver has the option of actuating a main brake cylinder connected to at least one brake circuit by actuating a brake pedal and to thereby generate a hydraulic pressure in the brake circuit, which acts on one or on multiple wheel brakes. Connected upstream from the wheel brakes in each case is a pressure regulator valve or an inlet valve, in order to adjust a braking force individually for each wheel. In braking systems that are able to carry out a braking process autonomously, the main brake cylinder is decoupled or decouplable from the brake circuit, so that when the brake pedal is actuated, a hydraulic pressure set by the main brake cylinder is pushed not into the brake circuit, but into a so-called pedal feel simulator. The hydraulic pressure in the brake circuit is then generated by an, in particular, electromotively drivable pressure generating unit with the aid of one or multiple pumps. A so-called brake-by-wire brake application is thus carried out, in which the brake pedal is hydraulically decoupled from the respective wheel brake. To ensure that this function is always available, an auxiliary pressure generating unit may be provided in the braking system in order for the hydraulic pressure to still be generated in the brake circuit in the event the pressure generating unit exhibits a malfunction or fails. This ensures a continued operation of the braking system, even in the case of a malfunction of the pressure generating unit.

To hydraulically connect the main brake cylinder to the wheel brakes, it is provided in such a design that the hydraulic pressure generating unit is assigned a first control valve, via which the hydraulic pressure generating unit is connected to the auxiliary hydraulic pressure generating unit, and the auxiliary pressure generating unit is assigned a second control valve, via which the auxiliary pressure generating unit and thus also the pressure generating unit are connectable to the main brake cylinder. Thus, the auxiliary pressure generating unit and the pressure generating unit are connected, in particular, in series. This ensures that if both pressure generators should fail, the driver is still able to bring the vehicle to a stop by actuation of the brake pedal and of a hydraulic coupling of the main brake cylinder to the brake circuit. In such a case, the control valves are actuated in such a way that the main brake cylinder is hydraulically coupled to the pressure generating units and thus also to the wheel brakes.

SUMMARY

A method according to an example embodiment of the present invention may have the advantage that when switching over from the pressure generating unit to the auxiliary pressure generating unit a delay in the brake force build-up is safely prevented. The method may ensure that when the first control valve is actuated to establish the connection to the auxiliary pressure generating unit or to the main brake cylinder, the hydraulic medium flowing back from the wheel brakes or from the pressure generating unit does not result in a pressure drop at the wheel brake. For this purpose, it is provided according to the present invention that the braking system is monitored for the presence of a brake demand, which is predefined, for example, by a brake pedal actuation or a control unit, and that when detecting a brake demand, the second control valve, via which the auxiliary pressure generating unit is connected to the main brake cylinder, is activated to interrupt the connection to the main brake cylinder. This prevents the hydraulic medium, which flows in the direction of the auxiliary pressure generating unit when the first control valve is opened, from being able to drain off into the main brake cylinder and to result in a pressure loss in the brake circuit. Thus, once a brake demand occurs, the second control valve is closed in order to interrupt the connection, and the first control valve is opened in order to ensure that the hydraulic pressure at the wheel brake may be provided by the auxiliary pressure generating unit.

According to one preferred specific embodiment of the present invention, the second control valve is activated upon each detection of a pressure demand to interrupt the connection. It is thus ensured that when a brake demand is present, the braking system is always pre-stressed by closing the second valve in such a way that a pressure loss in the braking system and in the brake circuit is prevented.

The second control valve is particularly preferably activated to interrupt the connection, each time for the duration of the respectively detected brake demand. The second control valve is thus closed as long as the brake demand is present. This ensures that the hydraulic pressure in the braking system or in the brake circuit experiences no significant pressure loss for the entire duration of the braking process.

It is further provided that upon detection of a brake demand, the first control valve is activated to establish the connection to the auxiliary pressure generating unit. As previously mentioned above, this ensures that the brake circuit or the wheel brake is acted upon by the hydraulic pressure provided by the auxiliary pressure generating unit. The pressure generating unit optionally includes a bypass, which is enabled when the first valve is opened; alternatively, the hydraulic medium is channeled through the pressure generating unit.

According to one preferred refinement of the present invention, a brake pedal assigned to the main brake cylinder and actuatable by a driver is monitored in terms of its actuation and/or a control unit is monitored in terms of an automated output of a brake demand for detecting the brake demand. Thus, the brake pedal is assigned, for example, a brake pedal path sensor, which monitors the brake pedal in terms of its actuation as well as of its actuation state, in order to generate as a function of the detected brake pedal path a brake demand, which is to be met by the pressure generating unit or, if it fails, by the auxiliary pressure generating unit. In vehicles that enable an automatic or autonomous braking process, the brake demand and the pressure demand are generated, for example, as a function of navigation data and/or of data of a surroundings sensor system of the vehicle.

The main brake cylinder is preferably connected in normal operation to a pedal feel simulator of the braking system, and the first control valve is activated to separate the connection of the pressure generating unit to the auxiliary pressure generating unit, so that, as previously mentioned at the outset, the driver is in fact able to actuate the accelerator pedal and to feel a brake counter-pressure, but the actual pressure build-up takes place in the braking system via the pressure generating unit.

A device according to an example embodiment of the present invention includes a control unit, which is specifically configured, when used as intended, to carry out or to execute the method according to example embodiments of the present invention. This yields the aforementioned advantages.

A braking system according to the present invention including includes the device according to the present invention. This also yields the aforementioned advantages. The control unit is, in particular, connected to a brake pedal path sensor and/or to a control unit of the braking system or is designed as a control unit of the braking system, as previously mentioned above, in order to detect a brake demand and to activate the pressure generating unit or the auxiliary pressure generating unit accordingly. The control unit is configured, in particular, to monitor the pressure generating unit for malfunctions and to activate the first control valve and the second control valve in order to deactivate the pressure generating unit when needed and to activate the auxiliary pressure generating unit for providing the desired hydraulic pressure, as previously described above.

A vehicle according to the present invention, in particular a motor vehicle includes the braking system according to the present invention. This yields the aforementioned advantages.

Further advantages and preferred features and feature combinations result, in particular, from the disclosure herein.

BRIEF DESCRIPTION OF THE DRAWINGS

The present invention is explained in greater detail below with reference to the figures.

DETAILED DESCRIPTION OF EXAMPLE EMBODIMENTS

Figure 1:
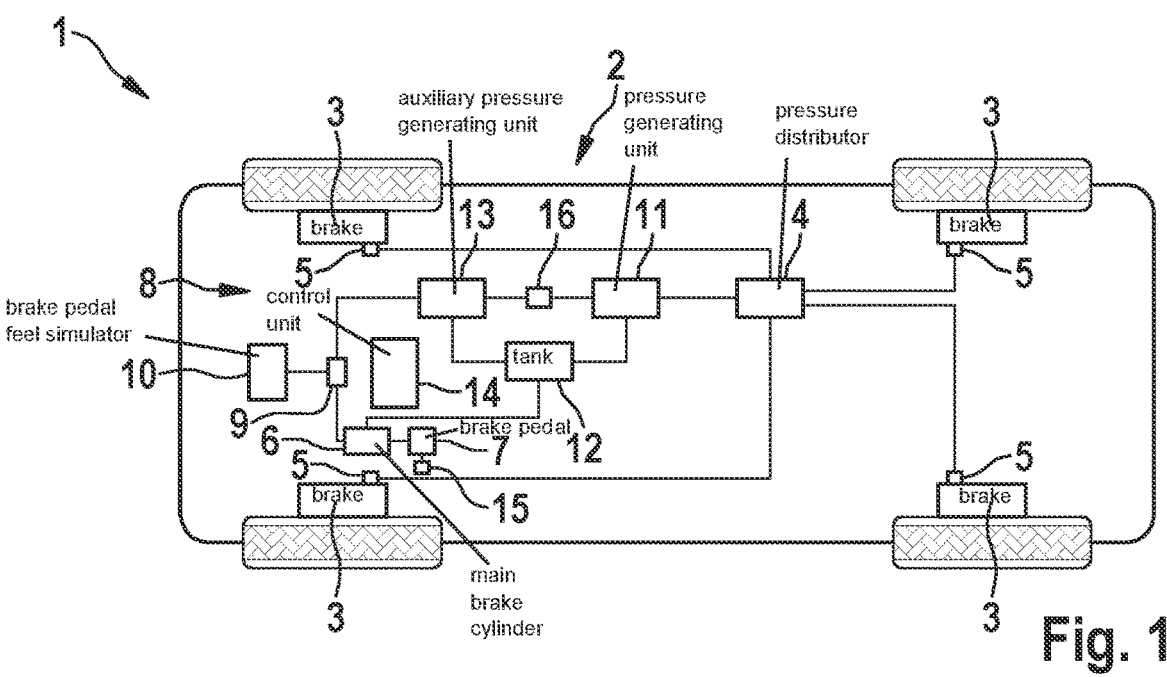
FIG. 1 shows a motor vehicle including an advantageous braking system in a simplified representation, in accordance with an example embodiment of the present invention.

FIG. 1 shows in a simplified top view a motor vehicle 1 including an advantageous braking system 2. For the sake of clarity, a drive system of motor vehicle 1 is not represented.

Braking system 2 includes multiple wheel brakes 3, each of which is assigned to one wheel of motor vehicle 1 in order, when needed, to be able to generate a braking force individually for each wheel. For this purpose, wheel brakes 3 are connected to a pressure distributor 4 of the braking system, which distributes a provided hydraulic pressure to wheel brakes 3. In this case, either each wheel brake 3 is assigned one inlet valve 5 each, via which the provided hydraulic pressure is utilized individually for each wheel, or pressure distributor 4 includes a corresponding inlet valve for respective wheel brake 3.

Braking system 2 further includes a main brake cylinder 6. Main brake cylinder 6 is mechanically coupled to a brake pedal 7 located in the vehicle interior and which may be actuated by the driver of the motor vehicle. Main brake cylinder 6 is designed as a simple brake cylinder or tandem brake cylinder in order to operate one or multiple brake circuits of motor vehicle 1. According to the present exemplary embodiment, the motor vehicle includes a brake circuit 8, to which wheel brakes 3 are assigned. Assigned to main brake cylinder 6 is a control valve 9, via which the main brake cylinder is connected in a first control position to brake circuit 8 and in a second position to a pedal feel simulator 10. If control valve 9 is in the second control position, the hydraulic volume provided by main brake cylinder 6 via the actuation of brake pedal 7 is shunted into brake pedal feel simulator 10 and does not enter into brake circuit 8, so that main brake cylinder 6 is hydraulically decoupled from brake circuit 8.

In the first control position, control valve 9 connects main brake cylinder 6 to a pressure generating unit 11. The latter is designed to generate, when needed, a hydraulic pressure in brake circuit 8. For this purpose, pressure generating unit 11 is connected, for example, to a tank 12 for receiving and providing the hydraulic medium and includes one or multiple hydraulic pumps, not shown in FIG. 1, including, for example, an electric motor, with the aid of which a hydraulic pressure distributable to wheel brakes 3 may be generated in braking system 2 downstream from pressure generating unit 11. Braking system 2 also includes an auxiliary pressure generating unit 13, which is also connected to tank 12 and is designed to generate, when needed, a hydraulic pressure in brake circuit 8, which may be distributed to wheel brakes 3. In this case, auxiliary pressure generating unit 13 resembles, in particular, pressure generating unit 11, so that auxiliary pressure generating unit 13 also includes one or multiple hydraulic pumps, which are, in particular, electromotively driveable or driven.

Braking system 2 further includes a control unit 14, which is connected to pressure generating units 11, 13, to pressure distributor 4, and/or to inlet valves 5, as well as to a brake pedal path sensor 15 assigned to brake pedal 7. Pressure generating unit 11 is connected in brake circuit 8 downstream from auxiliary pressure generating unit 13, a second control valve 16 being connected between pressure generating units 11, 13, which connects pressure generating unit 11 to auxiliary pressure generating unit 13 in a first control position, and separates the former from the latter or interrupts the connection in a second control position. Control unit 14 is also connected to the two control valves 9 and 16 in order to activate them. The aforementioned connections of control unit 14 are not shown in FIG. 1 for reasons of clarity.

In normal operation, braking system 2 operates as a brake-by-wire braking system, i.e., as a mechanically or hydraulically decoupled braking system. For this purpose, control unit 14 detects a brake pedal position, and thus an actuation state of brake pedal 7, with the aid of brake pedal path sensor 15 and activates pressure generating unit 11 as a function of the brake demand recognized via the brake pedal position, so that the pressure generating unit 11 provides a hydraulic pressure, which is distributed by inlet valves 5, in particular, pressure regulator valves, or by pressure distributer 4 to wheel brakes 3 individually for each wheel, in order to carry out an optimal braking process. In the process, control valve 9 is activated in such a way that it connects main brake cylinder 6 to pedal path feel simulator 10. Control valve 16 is also connected in such a way that it interrupts the connection to auxiliary pressure generating unit 13. This ensures that the hydraulic pressure generated by pressure generating unit 11 alone benefits wheel brakes 3.

Control unit 14 is also designed to monitor the operability of pressure generating unit 11. Control unit 14, if it detects a brake demand, activates control valve 9 so that the connection of pressure generating unit 13 to main brake cylinder 6 is interrupted. If the control unit also detects a malfunction or failure of pressure generating unit 11, it activates control valve 16 so that the connection of pressure generating unit 11 to auxiliary pressure generating unit 13 is established. In addition, the brake demand generated by brake pedal actuation 7 is now guided by control unit 14 to auxiliary pressure generating unit 13, so that the latter generates the desired hydraulic pressure in braking system 2.

Figure 3:
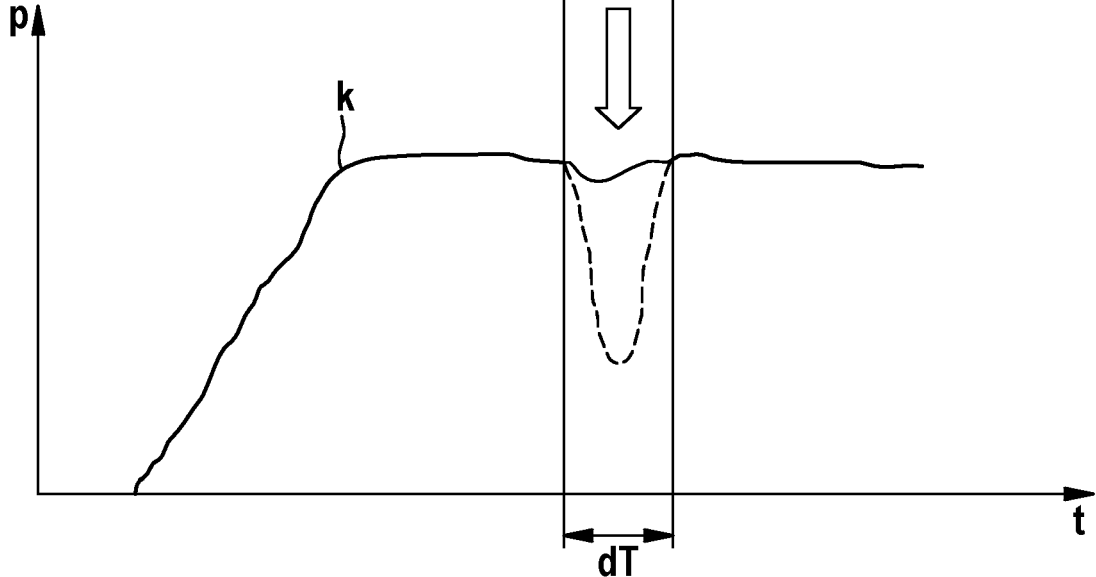
FIG. 3 shows a diagram for explaining the operating mode of the advantageous braking system, in accordance with an example embodiment of the present invention.

Because valve 16 is opened and the connection is established, hydraulic medium could flow from brake circuit 8 back in the direction of main brake cylinder 6 or of pedal feel simulator 10 due to the pressure already generated in brake circuit 8, so that the hydraulic pressure in brake circuit 8 must be built up again, as a result of which a short time span dT results, within which the pressure in brake circuit 8 or at wheel brakes 3 may decrease, as shown in FIG. 3.

FIG. 3 in this case shows hydraulic pressure p prevailing in brake circuit 8 plotted over time t based on a characteristic curve K, which shows the pressure curve resulting from a brake demand. Characteristic curve K in this case shows the pressure curve in the conventional case with a dashed section in time period dT.

However, because control unit 14, when detecting the brake demand, activates control valve 9 to interrupt the connection to main brake cylinder 6, the result is that the hydraulic medium is unable to flow back to main brake cylinder 6 or to tank 12, so that the hydraulic pressure in brake circuit 8 is largely maintained, as shown by the solid line in section dT in FIG. 3.

As a result of the advantageous method carried out by control unit 14, a temporary reduction of the hydraulic pressure in brake circuit 8 is prevented when a switch is made from pressure generating unit 11 to auxiliary pressure generating unit 13.

Figure 2:
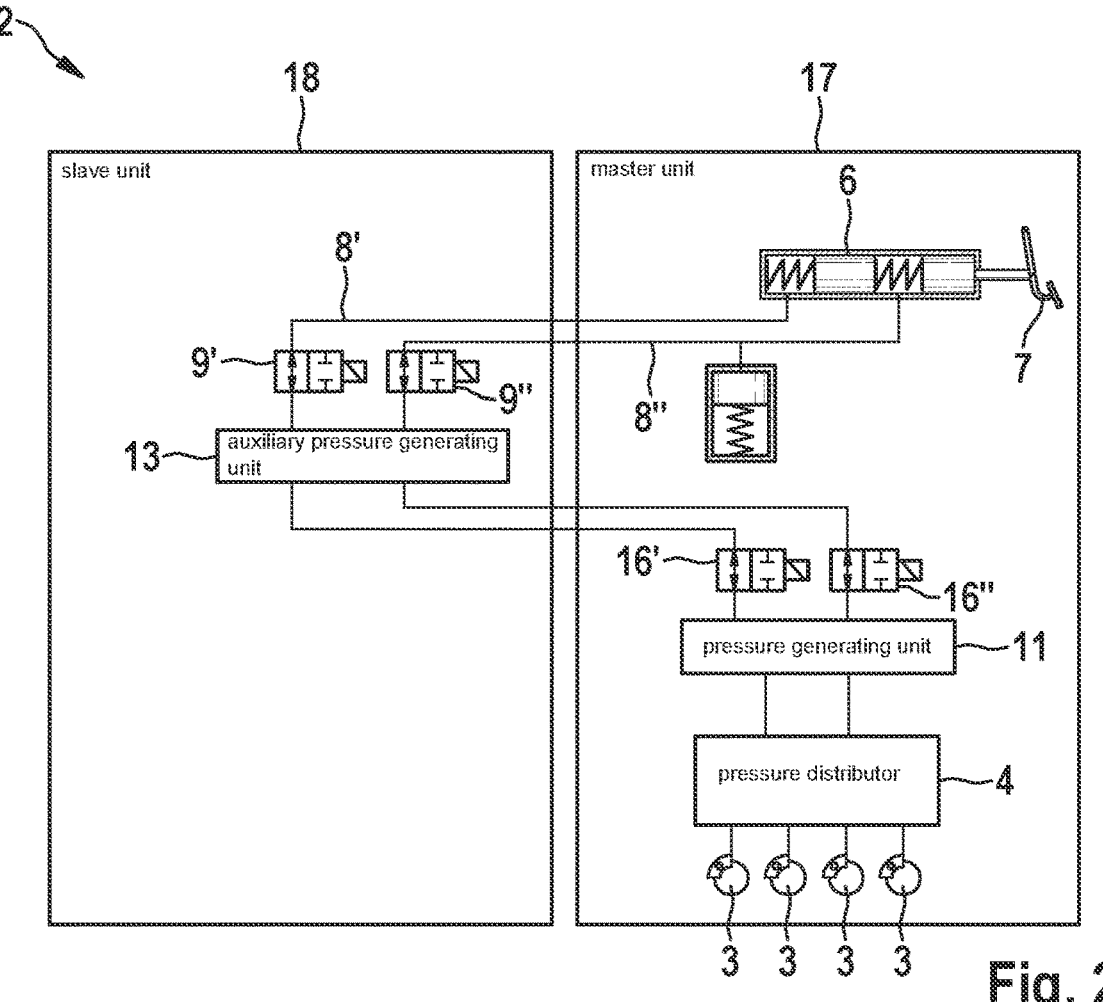
FIG. 2 shows a simplified representation of the braking system, in accordance with an example embodiment of the present invention.

FIG. 2 shows in a simplified representation braking system 2 according to one further exemplary embodiment. Elements already shown FIG. 1 are provided with the same reference numerals, so that reference is made in this regard to the above description. Essentially only the differences will be discussed below.

In contrast to the exemplary embodiment of FIG. 1, braking system 2 now includes two brake circuits 8' and 8'', which are connected to pressure generating units 11 and 13 and each include one first control valve 16', respectively 16'' and one second control valve 9', respectively 9''. Main brake cylinder 6 in this case is designed as a tandem cylinder, which includes two hydraulic pressure chambers, each of which is connected to one of brake circuits 8', respectively 8''.

Braking system 2 is further subdivided into a master unit 17 and a slave unit 18. Master unit 17 includes main brake cylinder 6, control valves 16', 16'', pressure generating unit 11, pressure distributor 4 as well as wheel brakes 3. Slave unit 18, which may also be referred to in this regard as an auxiliary unit or emergency unit, includes control valves 9' and 9'' as well as auxiliary pressure generating unit 13.

Because pressure generating units 11, 13 are connected in series, the result is that when auxiliary pressure generating unit 13 generates the hydraulic pressure, the latter is fed by pressure generating unit 11 through wheel brakes 3. If pressure generating unit 11 fails, control valves 9' and 9'' are both closed in order to interrupt the connection to main brake cylinder 6 and, therefore, to tank 12, so that the hydraulic medium is unable to drain off in that direction, so that hydraulic pressure p is maintained in brake circuits 8' and 8'', as shown in FIG. 3.

In order to prevent a drainage of brake fluid or hydraulic fluid, control valve 9 or 9', 9'' is then activated or closed by control unit 14 each time control unit 14 detects a pressure demand or brake demand. This ensures that each time pressure generating unit 11 is activated to generate a hydraulic pressure, control valve 9 or 9', 9'' is already closed, so that in the case of a failure of pressure generating unit 11, a switch-over may be made rapidly and without a loss of pressure to auxiliary pressure generating unit 13.

For this purpose, control unit 14 monitors on the one hand the brake pedal position of brake pedal 7 as well as an optionally present autonomous braking system for the occurrence of a brake demand. Once such a brake demand is recognized, control unit 14 activates control valve 9 or 9', 9'' accordingly in order to close it, to interrupt the connection from auxiliary pressure generating unit 13 to main brake cylinder 6.

In the event the driver of motor vehicle 1 him/herself wishes to take over the brake application of motor vehicle 1 by actuating brake pedal 7, this is also still possible, because a driver braking input detection present preferably in slave unit 18 is not influenced by the premature switching of control valves 9', 9'' or 9. Moreover, control valves 9', 9'' are not hydraulically stressed as a result of the counter-pressure not normally present, i.e. when the master unit or pressure generating unit 11 functions properly, so that as a result of the advantageous method no increased stress on control valves 9', 9'', 9 occurs.

What is claimed is:

1. A method for operating a hydraulic braking system for a motor vehicle, the braking system including a main brake cylinder actuatable by a driver and at least one brake circuit connected to the main brake cylinder, which includes at least one hydraulically actuable wheel brake, at least one activatable inlet valve for adjusting a braking force of the wheel brake being connected upstream from the wheel brake, and including an activatable pressure generating unit configured to generate a hydraulic pressure in the at least one brake circuit, also independently of an actuation of the main brake cylinder, when a pressure demand occurs, and including an activatable auxiliary pressure generating unit configured to alternatively generate the hydraulic pressure in the at least one brake circuit, the pressure generating unit being monitored for malfunctions and upon recognition of a malfunction, the auxiliary pressure generating unit being activated to generate the hydraulic pressure, the pressure generating unit being assigned a first control valve configured to establish or to interrupt a connection to the auxiliary pressure generating unit and the auxiliary pressure generating unit being assigned a second activatable control valve configured to interrupt or to establish a connection to the main brake cylinder, the method comprising:

monitoring the braking system for an occurrence of a brake demand; and activating, upon detection of a brake demand, the second control valve to interrupt the connection to the main brake cylinder to prevent hydraulic fluid from flowing back from the at least one brake circuit to the main brake cylinder, wherein with each detection of a brake demand, the second control valve is activated to interrupt the connection to the main brake cylinder, wherein the pressure generating unit and the auxiliary pressure generating unit hydraulically are arranged in series, wherein the first control valve selectively connects or disconnects the series arrangement, wherein the main brake cylinder is connected in normal operation with a pedal feel simulator of the braking system, and the first control valve is actuated to interrupt the connection of the pressure generating unit to the auxiliary pressure generating unit, wherein during the normal operation, the second control valve is activated to connect the main brake cylinder to the pedal feel simulator, such that the hydraulic fluid provided by the main brake cylinder does not enter the at least one brake circuit.

2. The method as recited in claim 1, wherein the second control valve is activated to interrupt the connection to the main brake system, for each detection of a brake demand, for a duration of the respectively detected brake demand.

3. The method as recited in claim 1, wherein upon detection of a brake demand, the first control valve is activated to establish the connection to the auxiliary pressure generating unit.

4. The method as recited in claim 3, wherein by activating the first control valve for establishing the connection, the pressure generating unit is hydraulically connected to the second control valve.

5. The method as recited in claim 1, wherein to detect a brake demand, a brake pedal assigned to the main brake cylinder and actuable by the driver is monitored in terms of its actuation and/or a control unit of the vehicle is monitored in terms of an automated output of a brake demand.

6. A device for operating a hydraulic braking system for a vehicle, the braking system including a main brake cylinder actuable by a driver and at least one brake circuit connected to the main brake cylinder, which includes at least one hydraulically actuable wheel brake, at least one activatable inlet valve for adjusting an activatable braking force of the wheel brake being connected upstream from the wheel brake, and including an activatable pressure generating unit configured to generate a hydraulic pressure in the at least one brake circuit, also independently of an actuation of the main brake cylinder, when a brake demand is detected, and including an activatable auxiliary pressure generating unit configured to alternatively generate the hydraulic pressure in the at least one brake circuit, and the pressure generating unit being assigned a first control valve for establishing or interrupting a connection to the auxiliary pressure generating unit, and the auxiliary pressure generating unit being assigned a second activatable control valve for establishing or interrupting a connection to the main brake cylinder, the device comprising:

a control unit configured to:

monitor the braking system for an occurrence of a brake demand; and activate, upon detection of a brake demand, the second control valve to interrupt the connection to the main brake cylinder to prevent hydraulic fluid from flowing back from the at least one brake circuit to the main brake cylinder, wherein with each detection of a brake demand, the second control valve is activated to interrupt the connection to the main brake cylinder, wherein the pressure generating unit and the auxiliary pressure generating unit hydraulically are arranged in series, wherein the first control valve selectively connects or disconnects the series arrangement, wherein the main brake cylinder is connected in normal operation with a pedal feel simulator of the braking system, and the first control valve is actuated to interrupt the connection of the pressure generating unit to the auxiliary pressure generating unit, wherein during the normal operation, the second control valve is activated to connect the main brake cylinder to the pedal feel simulator, such that the hydraulic fluid provided by the main brake cylinder does not enter the at least one brake circuit.

7. A hydraulic braking system for a motor vehicle, the braking system comprising:

a main brake cylinder actuable by a driver;

at least one brake circuit connected to the main brake cylinder,, which includes at least one hydraulically actuable wheel brake, at least one activatable inlet valve for adjusting an activatable braking force of the wheel brake being connected upstream from the wheel brake, an activatable pressure generating unit configured to generate a hydraulic pressure in the at least one brake circuit, also independently of an actuation of the main brake cylinder, when a brake demand is detected, and an activatable auxiliary pressure generating unit configured to alternatively generate the hydraulic pressure in the at least one brake circuit, wherein the pressure generating unit is assigned a first control valve for establishing or interrupting a connection to the auxiliary pressure generating unit, and the auxiliary pressure generating unit is assigned a second activatable control valve for establishing or interrupting a connection to the main brake cylinder; and a device including a control unit configured to:

monitor the braking system for an occurrence of a brake demand; and activate, upon detection of a brake demand, the second control valve to interrupt the connection to the main brake cylinder to prevent hydraulic fluid from flowing back from the at least one brake circuit to the main brake cylinder, wherein with each detection of a brake demand, the second control valve is activated to interrupt the connection to the main brake cylinder, wherein the pressure generating unit and the auxiliary pressure generating unit hydraulically are arranged in series, wherein the first control valve selectively connects or disconnects the series arrangement, wherein the main brake cylinder is connected in normal operation with a pedal feel simulator of the braking system, and the first control valve is actuated to interrupt the connection of the pressure generating unit to the auxiliary pressure generating unit, wherein during the normal operation, the second control valve is activated to connect the main brake cylinder to the pedal feel simulator, such that the hydraulic fluid provided by the main brake cylinder does not enter the at least one brake circuit.

8. A motor vehicle including a hydraulic braking system, the hydraulic braking system comprising:

a main brake cylinder actuatable by a driver;

at least one brake circuit connected to the main brake cylinder,, which includes at least one hydraulically actuatable wheel brake, at least one activatable inlet valve for adjusting an activatable braking force of the wheel brake being connected upstream from the wheel brake, an activatable pressure generating unit configured to generate a hydraulic pressure in the at least one brake circuit, also independently of an actuation of the main brake cylinder, when a brake demand is detected, and an activatable auxiliary pressure generating unit configured to alternatively generate the hydraulic pressure in the at least one brake circuit, wherein the pressure generating unit is assigned a first control valve for establishing or interrupting a connection to the auxiliary pressure generating unit, and the auxiliary pressure generating unit is assigned a second activatable control valve for establishing or interrupting a connection to the main brake cylinder; and a device including a control unit configured to:

monitor the braking system for an occurrence of a brake demand; and activate, upon detection of a brake demand, the second control valve to interrupt the connection to the main brake cylinder to prevent hydraulic fluid from flowing back from the at least one brake circuit to the main brake cylinder, wherein with each detection of a brake demand, the second control valve is activated to interrupt the connection to the main brake cylinder, wherein the pressure generating unit and the auxiliary pressure generating unit hydraulically are arranged in series, wherein the first control valve selectively connects or disconnects the series arrangement, wherein the main brake cylinder is connected in normal operation with a pedal feel simulator of the braking system, and the first control valve is actuated to interrupt the connection of the pressure generating unit to the auxiliary pressure generating unit, wherein during the normal operation, the second control valve is activated to connect the main brake cylinder to the pedal feel simulator, such that the hydraulic fluid provided by the main brake cylinder does not enter the at least one brake circuit.

* * * * *